(12) United States Patent
Witzel et al.

(10) Patent No.: US 7,180,599 B2
(45) Date of Patent: Feb. 20, 2007

(54) POLARIZATION EFFECT AVERAGING

(75) Inventors: Eckart Witzel, Herrenberg (DE); Hansjoerg Haisch, Altdorf (DE)

(73) Assignee: Agilent Technologies, Inc., Palo Alto, CA (US)

(*) Notice: Subject to any disclaimer, the term of this patent is extended or adjusted under 35 U.S.C. 154(b) by 393 days.

(21) Appl. No.: 10/462,341

(22) Filed: Jun. 13, 2003

(65) Prior Publication Data

US 2004/0036889 A1      Feb. 26, 2004

(30) Foreign Application Priority Data

Aug. 22, 2002  (EP) ................................ 02018761

(51) Int. Cl.
*G01B 9/02* (2006.01)
*G01B 11/02* (2006.01)
*G01N 21/00* (2006.01)

(52) U.S. Cl. ............... 356/477; 356/492; 356/73.1
(58) Field of Classification Search ......... 356/73.1, 356/477, 479, 492; 250/227.19, 227.27; 385/12

See application file for complete search history.

(56) References Cited

U.S. PATENT DOCUMENTS

| | | | |
|---|---|---|---|
| 3,927,945 A | 12/1975 | Bates | |
| 6,606,158 B2* | 8/2003 | Rosenfeldt et al. | 356/477 |
| 6,943,891 B2* | 9/2005 | VanWiggeren | 356/477 |
| 2002/0093644 A1 | 7/2002 | Colbourne et al. | |
| 2003/0223073 A1* | 12/2003 | VanWiggeren et al. | 356/477 |
| 2004/0036889 A1* | 2/2004 | Witzel et al. | 356/73.1 |
| 2006/0114471 A1* | 6/2006 | Cyr | 356/477 |

FOREIGN PATENT DOCUMENTS

| EP | 1 191 320 | 3/2002 |
|---|---|---|
| GB | 2 350 184 | 11/2000 |

OTHER PUBLICATIONS

European Search Report, Application No. EP 02 01 8761, dated Feb. 17, 2003.

* cited by examiner

*Primary Examiner*—Gregory J. Toatley, Jr.
*Assistant Examiner*—Patrick J Connolly (57) ABSTRACT

In order to reduce polarization dependent error, the polarization state of incident light is set to at least two different states of polarization, and a first optical property is determined separately for each of said at least two states of polarization. Then, an averaging procedure is carried out in order to obtain a mean value of the first optical property or of a property derived therefrom. Alternatively, the averaging procedure can be performed with respect to a DUT property of a device under test that is determined as a function of said first optical property.

16 Claims, 6 Drawing Sheets

POLARIZATION EFFECT AVERAGING

BACKGROUND OF THE INVENTION

The present invention is related to the determination of an optical property of a light beam, e.g. received from device under test.

Because of the large transmission bandwidth of fiber optical components, such components are of rising importance for the implementation of networking backbones, for example for the internet. For these applications, accurate measuring techniques for determining optical properties such as polarization dependent transmission, Differential Group Delay, etc. are required. A lot of optical properties have to be measured as a function of wavelength. In order to obtain reliable results, both the wavelength itself and the respective optical property have to be determined with high accuracy.

SUMMARY OF THE INVENTION

It is an object of the invention to provide an improved determination of an optical property of a light beam. The object is solved by the independent claims. Preferred embodiments are shown by the dependent claims.

According to a first embodiment of the invention, the state of polarization of an incident light, or of a part thereof, is set by means of a first polarization controller. A first polarized output with at least two different states of polarization is obtained. The polarized light is forwarded to a first determination unit, which determines, for each of said at least two different states of polarization, a first optical property. A mean value of the optical property values for said at least two different states of polarization, or of a property derived therefrom, is determined by a processing unit, in order to eliminate any polarization dependent measurement error.

Many types of optical property determination show some kind of polarization dependence, and therefore, the state of polarization of the incident light affects the result of the measurement. Especially, but not only, interferometric devices that generate an interference pattern by splitting up the incoming light into different light paths cause polarization dependent measurement errors. The invention is not limited to interferometric devices, though. Different polarization states are generated on purpose in the optical property determination path, and then, an averaging procedure is performed. This simple solution leads to a considerable reduction of measurement errors. This concept can be applied both to single measurements and to repeated measurements of said first optical property.

According to a second embodiment of the invention, the apparatus comprises a second determination unit for receiving a response signal of a device under test, whereby said response signal is obtained in response to a signal derived from said incident light. From said response signal, a first DUT property of the device under test is determined. The first DUT property represents an optical property of the DUT. Both the first optical property and the first DUT property are forwarded to a processing unit, which is adapted for determining an averaged DUT property from the first DUT property and the first optical property. For this purpose, the processing unit determines a mean value of at least one of: the first optical property determined for said at least two states of polarization, or a property derived from the first optical property as well as from the first DUT property for each of said at least two states of polarization.

In the second embodiment of the invention, the apparatus comprises a light path for a device under test in addition to the optical property determination path. By means of a second determination unit, a first DUT property is determined. The optical property determination path is used as a reference when determining said first DUT property. But the optical property values are impaired by a polarization dependent error, and said error is transformed in a DUT property measurement error. This DUT-parameter measurement error can be eliminated or at least reduced by averaging at least one of: the first optical property determined for said at least two states of polarization, or a property derived from the first optical property as well as from the first DUT property for said at least two states of polarization. By recording measurements for at least two different states of polarization, and by performing an averaging over said at least two states of polarization, it is possible to reduce or even eliminate the polarization dependent error.

The measurement set-up according to the second embodiment of the invention is very versatile and can be used for the determination of any property of the device under test, for example for the determination of transmission or reflectivity of the device under test, or for the determination of the Jones matrix of the device under test. The measurements for the different states of polarization do not have to be performed consecutively. By means of a beam splitter, it is possible to perform the measurements for different states of polarization in parallel, and the measurement time is kept small.

According to a preferred embodiment of the invention, the first optical property determined by said first determination unit is the wavelength of the incident light. By providing two light paths, a light path for determining said first DUT property and a wavelength determination path, it is possible to obtain said first DUT property as a function of wavelength. Said wavelength, or a property derived therefrom, is determined for at least two different states of polarization, and by performing an averaging operation, the polarization dependent error is decreased.

According to a preferred embodiment, the incident light is generated by a tunable light source, and preferably, said light source performs wavelength sweeps over a whole range of wavelengths. This allows to study device properties in dependence on the wavelength. Preferably, the polarization is set to a first state of polarization during the first wavelength sweep, to a second state of polarization during the second wavelength sweep, etc. At the end of a wavelength sweep, the state of polarization of the polarization controller is set to the next state of polarization. During a wavelength sweep, the state of polarization is not changed, and therefore, the measurements are simplified.

According to a preferred embodiment of the invention, the wavelength is changed over time during a wavelength sweep, and the first optical property is measured for discrete points of time. For this purpose, the measurement device might comprise an internal clock that triggers the wavelength measurement.

Preferably, the values of the first DUT property determined in the light path that comprises the device under test (DUT) are related to corresponding values of the first optical property. A DUT property value measured at a certain time is related to a value of the first optical property determined at the same time for a certain state of polarization. Thus, the first DUT parameter of the device under test, which has been recorded as a function of time, is now known as a function of the first optical property, e.g. as a function of wavelength or frequency of the incident light, or of any other optical property that can serve as a reference for said DUT parameter measurements.

A first dependency of said first DUT property on the respective optical property is obtained for the first state of polarization, a second dependency of said DUT property on the optical property is obtained for the second state of polarization, etc. The averaging is performed by determining the average of DUT property values that correspond to the same value of the first optical property. The averaging is performed with respect to said first optical property, and not with respect to time. In order to perform said averaging procedure and to determine the averaged DUT property, it might be advantageous to interpolate between consecutive DUT property values. By means of such an interpolation, it is possible to obtain DUT property values that correspond to the same value of said optical property.

In case said tunable light source performs wavelength sweeps, it does no longer matter whether the wavelength sweeps performed for said first and said second state of polarization are coincident or not. The accuracy of the wavelength sweeps is no longer important, because the first DUT property of the device under test is related to said first optical property, e.g. to the wavelength, to the frequency, or to any other optical property. This means that the requirements concerning the accuracy of the wavelength sweeps performed by the tunable light source can be lowered.

According to a preferred embodiment of the invention, both the values of said first DUT property and the values of said first optical property are determined regularly, at discrete instants of time. For example, the measurements both in the light path comprising the DUT and in the light path for determining the first optical property might be triggered by a common clocking circuit.

According to a further preferred embodiment of the invention, the measurement set-up comprises two polarization controllers, one for the optical property determination path, and one for the light path comprising the DUT. With a set-up of this kind, the states of polarization in said two light paths can be controlled independently. This allows to vary the state of polarization in the optical property determination path, while the state of polarization in the light path of the device under test is kept constant. Thus, it is possible to reduce the polarization dependent error and improve the measurement accuracy of the optical property without varying the state of polarization in the light path of the device under test. The first DUT property can therefore be measured with respect to a substantially constant state of polarization within the light path of the DUT.

In case the measurement set-up comprises only one polarization controller both for the optical property determination path and for the light path of the DUT, the light in both light paths is polarized in the same way. For example, for determining the Jones matrix, which describes the transmission properties of a device under test, such a simple measurement set-up is sufficient. From the Eigenvalues of the Jones matrix, the Differential Group Delay (DGD) of a device under test can be obtained. The Differential Group Delay is a measure for the polarization dependent dispersion of the device under test.

The concept according to one of the above embodiments can be partly or entirely embodied or supported by one or more suitable software programs, which can be stored on or otherwise provided by any kind of data carrier, and which might be executed in or by any suitable data processing unit. Software programs or routines are preferably applied for instrument control and calculation of device properties and wavelength.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF EMBODIMENTS OF THE INVENTION

Figure 1:
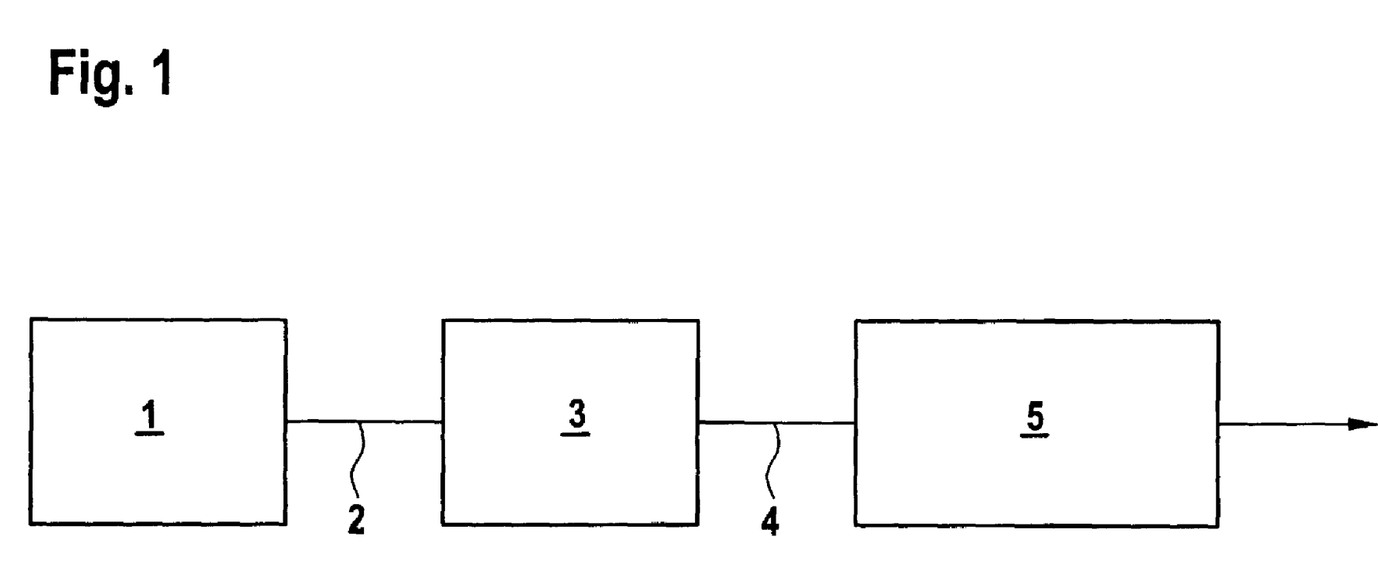
FIG. 1 shows a measurement set-up for determining the wavelength of incident light.

In FIG. 1, the set-up of a wavelength determination unit according to a first embodiment of the invention is shown. The measurement set-up comprises a tunable laser source 1 which generates monochromatic light 2 of a wavelength $\lambda_{true}$. The tunable laser source 1 is capable of performing a wavelength sweep over time, whereby the wavelength $\lambda_{true}$ is increased in a nearly linear way as a function of time:

$$\lambda_{true}(t) \propto t$$

The monochromatic light 2 is forwarded to a polarization controller 3, which sets the polarization of said monochromatic light 2 to a well-defined state of polarization (SOP). At the output of the polarization controller 3, monochromatic light 4 with a well-defined state of polarization is obtained. The wavelength of said light is measured by means of a wavelength determination unit 5, which might comprise an interferometric device such as a Michelson-interferometer or a Mach-Zehnder-interferometer. The wavelength is determined by analyzing the interference pattern, for example by counting the interference fringes. The measured wavelength $\hat{\lambda}(kT)$ is obtained at discrete instants $k \cdot T$ of time, whereby k is a natural number.

Figure 2A:
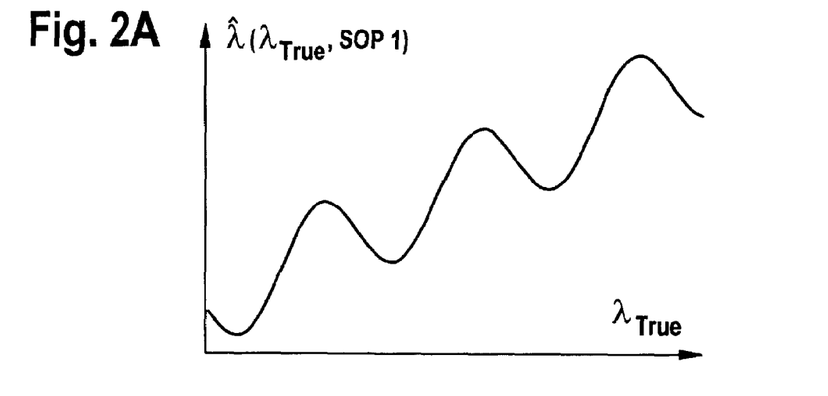
FIGS. 2A–B depict dependencies of wavelength functions on the state of polarization.
Figure 2B:
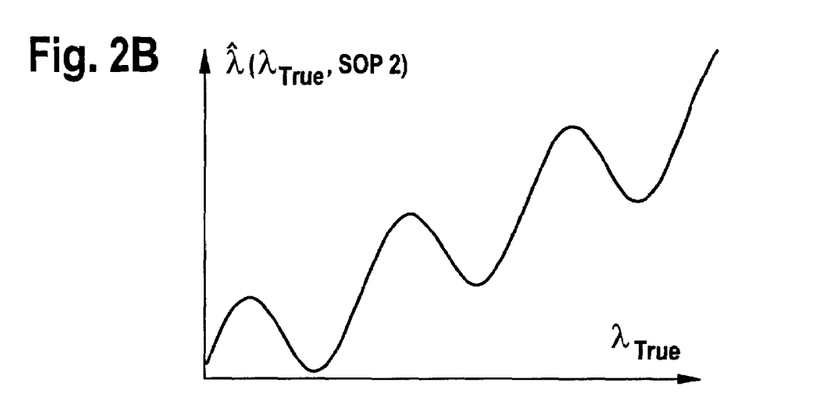

In FIG. 2A, the measured wavelength $\hat{\lambda}(\lambda_{true}, SOP1)$ is shown as a function of the true wavelength $\lambda_{true}$ for a first state of polarization SOP1. In FIG. 2B, the measured wavelength $\hat{\lambda}(\lambda_{true}, SOP2)$ is shown as a function of $\lambda_{true}$ for a second state of polarization SOP2. From FIGS. 2A and 2B, it can be seen that an interferometric measurement set-up for the determination of wavelengths causes an oscillating error that is superimposed on the true wavelength and that depends both on the state of polarization (SOP) and on the wavelength itself. The measured wavelength can be written as:

$$\hat{\lambda} = \lambda_{true} + \lambda_{error}(\lambda_{true}, SOP)$$

The error $\lambda_{error}$ is periodical over both polarization and wavelength; its mean value is equal to zero.

The polarization dependent wavelength error $\lambda_{error}$ can be reduced by averaging over at least two wavelength sweeps, whereby a different state of polarization is used during each of the at least two wavelength sweeps. From $\hat{\lambda}(\lambda_{true}, SOP1)$ shown in FIG. 2A and $\hat{\lambda}(\lambda_{true}, SOP2)$ shown in FIG. 2B, the averaged wavelength can be obtained by calculating the arithmetic means of $\hat{\lambda}(\lambda_{true}, SOP1)$ and $\hat{\lambda}(\lambda_{true}, SOP2)$:

$$\hat{\lambda}_{AVERAGED}(kT) = \frac{\hat{\lambda}(\lambda_{true}, SOP1) + \hat{\lambda}(\lambda_{true}, SOP2)}{2}$$

Figure 2C:
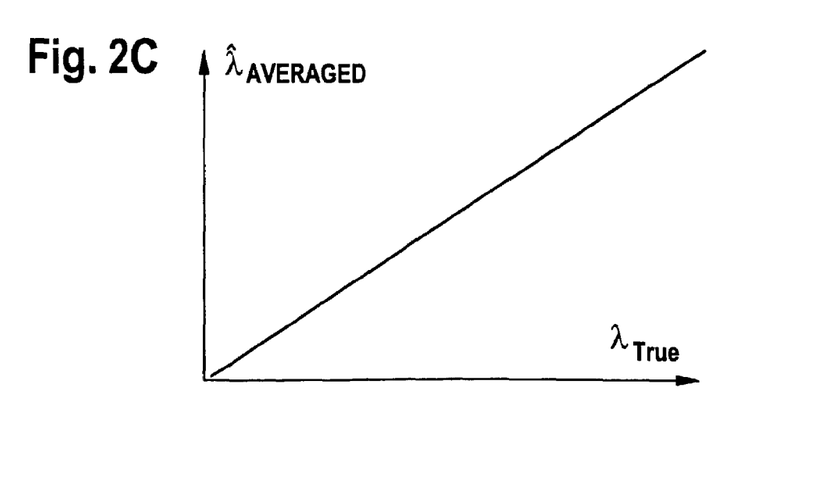
FIG. 2C depicts an averaged wavelength function of a true wavelength.

In FIG. 2C, the averaged wavelength is shown as a function of the true wavelength $\lambda_{true}$. If the oscillating wavelength error in FIG. 2A is sufficiently out of phase compared to the oscillating wavelength error in FIG. 2B, the wavelength error of the averaged wavelength is significantly reduced. For this reason, $\hat{\lambda}_{AVERAGED} \approx \lambda_{true}$.

The inventive concept of reducing measurement inaccuracy by averaging over several measurements with different states of polarization is not only applicable to wavelength sweeps, but also to single wavelength measurements. The averaging over at least two states of polarization can be performed for a single wavelength.

Figure 3:
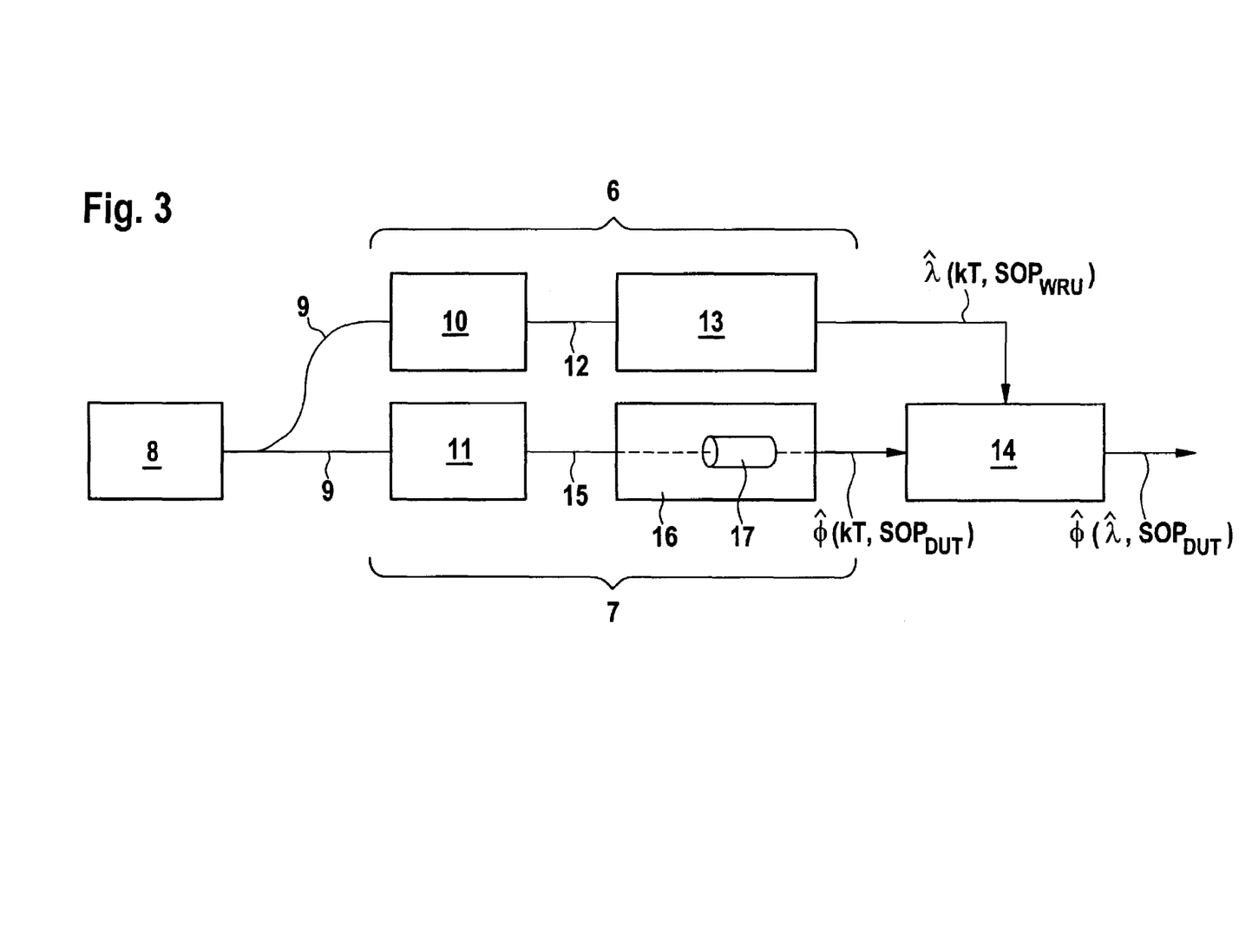
FIG. 3 shows a measurement set-up comprising a wavelength determination path and a optical parameter determination path.

In FIG. 3, a second embodiment of the invention is shown. In this embodiment, an optical parameter $\phi$ of a device under test (DUT) is measured as a function of wavelength. The measurement set-up shown in FIG. 3 comprises a wavelength determination path 6 and a light path 7 for the device under test. Monochromatic light 9 from a tunable laser source 8 is forwarded both to a polarization controller 10 for the wavelength determination path 6 and to a polarization controller 11 for the light path 7. The tunable laser source 8 performs wavelength sweeps; the wavelength of the laser light is continuously increased or decreased over a range of wavelengths as a function of time.

The polarization controller 10 sets the state of polarization $SOP_{WRU}$ for the wavelength determination path 6 and generates polarized light 12. In the wavelength reference unit (WRU) 13, the wavelength of the polarized light 12 is determined. This can be done by means of an interferometric device, for example by means of a Michelson-interferometer or a Mach-Zehnder-interferometer. The wavelength is determined in regular time intervals at discrete instants of time k·T. Thus, the measured wavelength $\hat{\lambda}(kT, SOP_{WRU})$ is obtained. The measured wavelength $\hat{\lambda}(kT, SOP_{WRU})$ depends both on the measurement time k·T and on the state of polarization $SOP_{WRU}$. The measured wavelength $\hat{\lambda}(kT, SOP_{WRU})$ is forwarded to the processing unit 14.

The polarization controller 11 sets the state of polarization $SOP_{DUT}$ for the light path 7. In the measurement set-up of FIG. 3, two separate polarization controllers 10 and 11 are used for the wavelength determination path 6 and for the light path 7, and therefore, the state of polarization $SOP_{WRU}$ in the wavelength determination path 6 can be varied independently of the state of polarization $SOP_{DUT}$ in the light path 7. At the output of the polarization controller 11, polarized light 15 with a state of polarization $SOP_{DUT}$ is obtained, which is forwarded to a sensor unit box 16. The sensor unit box 16 contains the device under test 17 and determines the optical parameter $\hat{\phi}$ of said device under test 17. The optical parameter $\hat{\phi}$ is measured synchronously with the wavelength $\hat{\lambda}(kT, SOP_{WRU})$ at the same discrete instants of time k·T. The obtained measurement values $\hat{\phi}(kT, SOP_{DUT})$ are forwarded to the processing unit 14, which relates each of said values $\hat{\phi}(kT, SOP_{DUT})$ to a wavelength value $\hat{\lambda}(kT, SOP_{WRU})$ corresponding to the same k·T. By doing this, the time dependence of $\hat{\phi}$ is eliminated, and the optical property $\hat{\phi}(\hat{\lambda}, SOP_{DUT})$ is obtained as a function of the measured wavelength $\hat{\lambda}$, and of $SOP_{DUT}$.

$\hat{\phi}(\hat{\lambda}, SOP_{DUT})$ is recorded for at least two different wavelength sweeps, whereby for each wavelength sweep, the polarization $SOP_{WRU}$ in the wavelength determination path 6 is set to a different state. The state of polarization $SOP_{DUT}$ in the light path 7 remains constant during all these wavelength sweeps. For each setting of $SOP_{WRU}$, a different dependency of $\hat{\phi}(\hat{\lambda}, SOP_{DUT})$ on $\hat{\lambda}$ is obtained. In order to reduce or even eliminate the DUT-parameter measurement error $\phi_{error}$, the average $\hat{\phi}_{AVERAGED}(\hat{\lambda}, SOP_{DUT})$ of the various functions $\hat{\phi}(\hat{\lambda}, SOP_{DUT})$ recorded for different $SOP_{WRU}$ is calculated. The measurement inaccuracy is considerably reduced by averaging the optical parameter $\hat{\phi}$ over different states of polarization $SOP_{WRU}$.

Figure 4A:
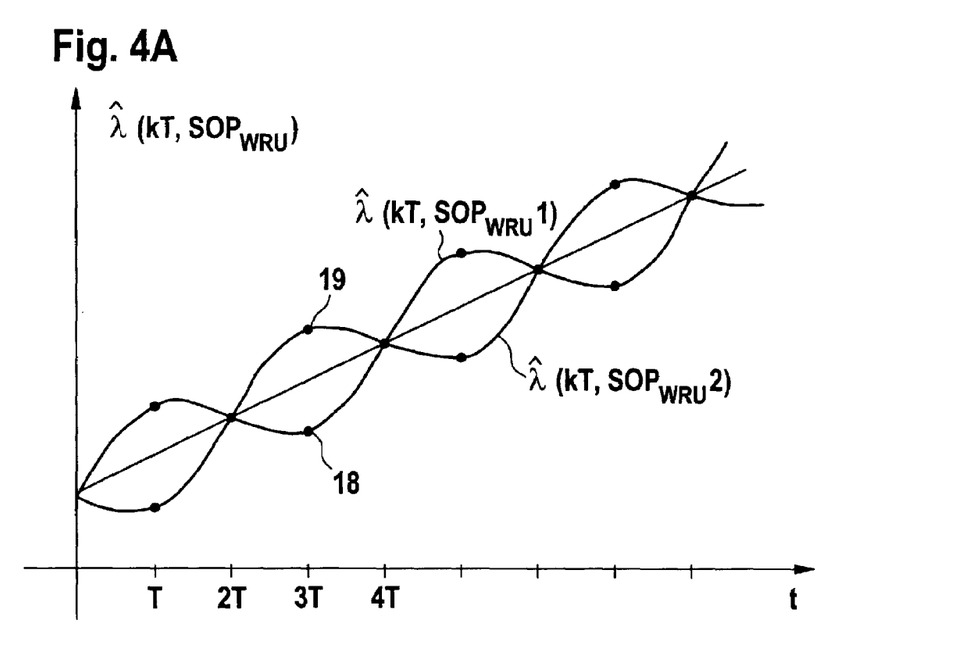
FIG. 4A depicts the measured wavelength as a function of time for a state of polarization $SOP_{WRU}$.
Figure 4B:
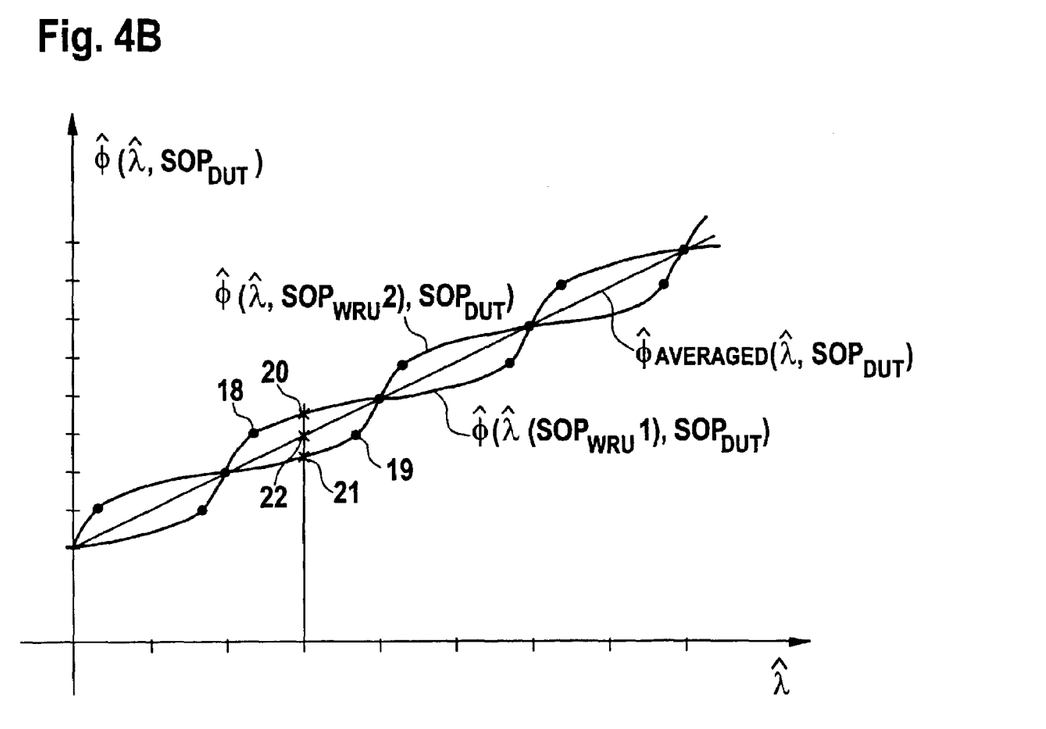
FIG. 4B depicts the measured optical parameter $\hat{\phi}$ as a function of the wavelength $\hat{\lambda}$.

FIGS. 4A and 4B show how this averaging procedure is performed. In FIG. 4A, $\hat{\lambda}(kT, SOP_{WRU})$ is depicted as a function of time k·T for two different states of polarization $SOP_{WRU}1$ and $SOP_{WRU}2$. During the first wavelength sweep, the state of polarization in the wavelength determination path 6 is set to $SOP_{WRU}1$, and during the second wavelength sweep, it is set to $SOP_{WRU}2$. It can be seen that there is a wavelength error superimposed on the measured wavelengths, which is periodical over the wavelength, and which depends on the state of polarization $SOP_{WRU}$ in the wavelength determination path.

For a suitable choice of $SOP_{WRU}1$ and $SOP_{WRU}2$, the measured wavelengths $\hat{\lambda}(kT, SOP_{WRU}1)$ and $\hat{\lambda}(kT, SOP_{WRU}2)$ are out of phase. For example, at the instant of time 3T, the wavelength measured for $\hat{\lambda}(kT, SOP_{WRU}1)$ at the measurement point 18 is smaller than $\lambda_{true}$, which means that there is a negative wavelength error. At the measurement point 19, the wavelength measured for $\hat{\lambda}(kT, SOP_{WRU}2)$ is larger than the true wavelength $\lambda_{true}$, and there is a positive wavelength error.

For each instant of time k·T, the optical parameter $\hat{\phi}$ is measured in the sensor unit box 16, and a measurement value $\hat{\phi}(kT, SOP_{DUT})$ is obtained. Usually, one is interested in the wavelength dependence of $\hat{\phi}$, and not in the time dependence of $\hat{\phi}$, because the way $\hat{\phi}$ depends on the time depends on how the respective wavelength sweep is performed. There might be tunable laser sources that are capable of producing the same wavelength sweeps again and again, but usually, there is some variability, and the dependency of the wavelength on time is not strictly linear. Some wavelength sweeps might rise more quickly than others. For this reason, it is desirable to get rid of the time dependence of $\hat{\phi}(kT, SOP_{DUT})$ and to express $\hat{\phi}$ in terms of the wavelength.

For a certain instant of time, for example for the instant of time 3T, the measured parameter value $\hat{\phi}(3T, SOP_{DUT})$ is related to the corresponding wavelength value measured at this instant of time, in our example to $\hat{\lambda}(3T, SOP_{WRU})$. In FIG. 4B, the thus obtained dependencies of $\hat{\phi}$ on $\hat{\lambda}$ are shown for two different states of polarization $SOP_{WRU}1$ and $SOP_{WRU}2$. When relating $\hat{\phi}$ to $\hat{\lambda}$ at the point of time 3T for $SOP_{WRU}1$, the measurement point 18 is obtained. When relating $\hat{\phi}$ to $\hat{\lambda}$ at the same point of time 3T for $SOP_{WRU}2$, the measurement point 19 is obtained. By relating each value of $\hat{\phi}$ to corresponding values of $\hat{\lambda}$ for at least two different states of polarization $SOP_{WRU}1$ and $SOP_{WRU}2$, the curves $\hat{\phi}(\hat{\lambda}(SOP_{WRU}1), SOP_{DUT})$ and $\hat{\phi}(\hat{\lambda}(SOP_{WRU}2), SOP_{DUT})$ are obtained. The oscillations that can still be seen in these curves of $\hat{\phi}$ as a function of $\hat{\lambda}$ result from the polarization dependent wavelength error shown in FIG. 4A. This wavelength error is transformed in a corresponding DUT-parameter measurement error $\hat{\phi}_{error}$.

In order to eliminate or at least reduce the DUT-parameter measurement error $\hat{\phi}_{error}$, the processing unit 14 calculates the arithmetic means of $\hat{\phi}(\hat{\lambda}(SOP_{WRU}1), SOP_{DUT})$ and $\hat{\phi}(\hat{\lambda}(SOP_{WRU}2), SOP_{DUT})$. The averaged DUT-parameter $$\hat{\phi}_{AVERAGED}(\hat{\lambda}, SOP_{DUT}) = \frac{1}{2}(\hat{\phi}(\hat{\lambda}(SOP_{WRU}1), SOP_{DUT}) + \hat{\phi}(\hat{\lambda}(SOP_{WRU}2), SOP_{DUT}))$$

is obtained, which gives a dependency of the averaged DUT-parameter $\hat{\phi}_{AVERAGED}$ on $\hat{\lambda}$ and $SOP_{DUT}$. The averaging procedure is no longer performed with respect to time, but with respect to wavelength. For example, the measurement points 20 and 21 correspond to the same wavelength $\hat{\lambda}$. The averaged point 22 is obtained by averaging the value $\hat{\phi}$ of point 20 and of point 21. The measurement points 20 and 21 have not been recorded at the same time, though. Measurement point 20 has been recorded at a time t>3T, and measurement point 21 has been recorded at a time t<3T. Therefore, the averaging procedure is no longer performed with respect to values of $\hat{\phi}$ that correspond to the same time t, but with respect to values of $\hat{\phi}$ that correspond to the same wavelength. The time dependency of the wavelength sweeps is no longer important for this kind of averaging procedure, and therefore, the requirements concerning the accuracy of the wavelength sweeps can be considerably reduced.

When the states of polarization $SOP_{WRU}1$ and $SOP_{WRU}2$ are chosen in a suitable way, $\hat{\phi}(\hat{\lambda}(SOP_{WRU}1), SOP_{DUT})$ and $\hat{\phi}(\hat{\lambda}(SOP_{WRU}2), SOP_{DUT})$ are sufficiently out of phase, and the periodical error $\hat{\phi}$ error superimposed on $\hat{\phi}_{AVERAGED}(\hat{\lambda}, SOP_{DUT})$ is considerably reduced. In FIG. 4B, the averaged DUT-parameter $\hat{\phi}_{AVERAGED}(\hat{\lambda}, SOP_{DUT})$ is shown as a function of $\hat{\lambda}$.

Figure 5:
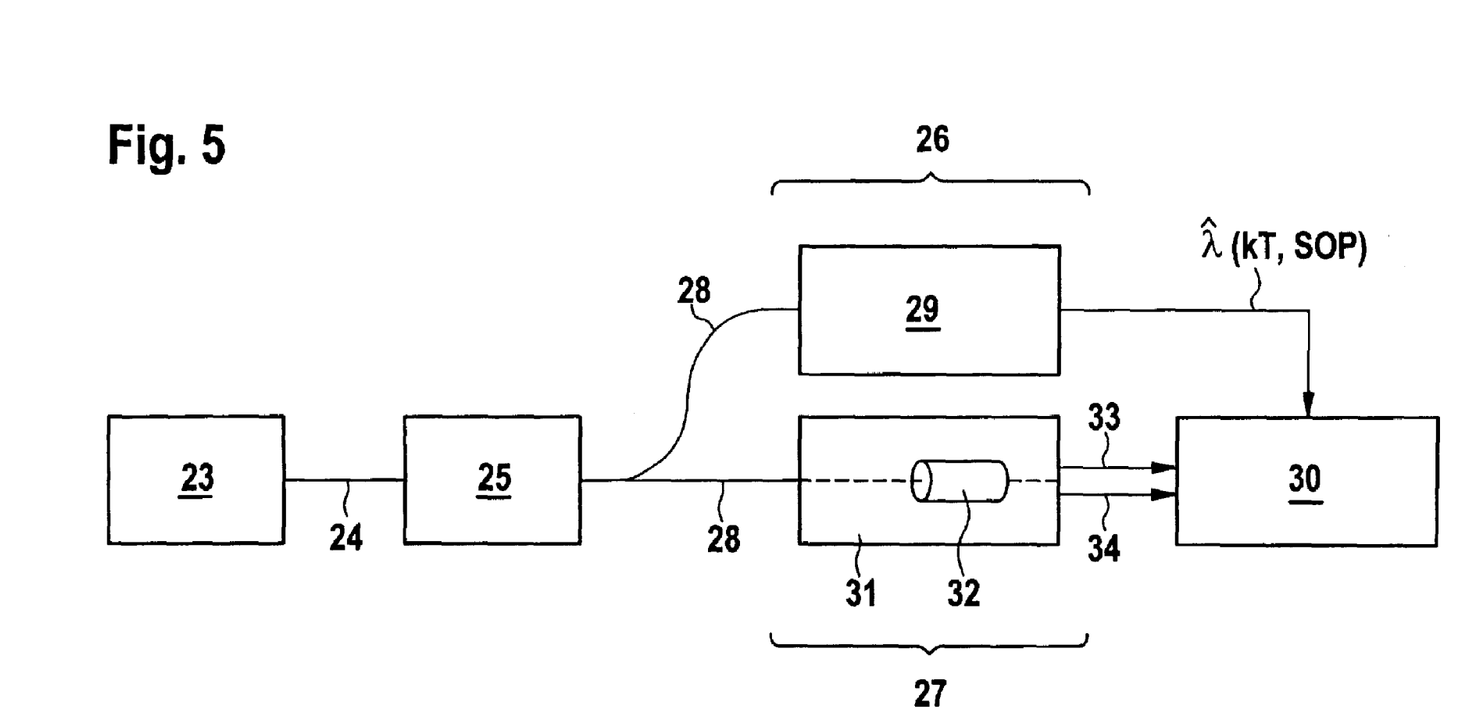
FIG. 5 shows a simplified measurement set-up comprising only one polarization controller.

In the following, a third embodiment of the invention will be described that is shown in FIG. 5. A tunable laser source 23 emits monochromatic light 24 and performs wavelength sweeps, whereby the state of polarization (SOP) of said monochromatic light 24 is set by the polarization controller 25. The set-up shown in FIG. 5 comprises only one single polarization controller 25, which sets the state of polarization both for the wavelength determination path 26 and for the optical parameter determination path 27. This is the main difference between the third embodiment shown in FIG. 5 and the second embodiment shown in FIG. 3. While in the second embodiment of the invention, the states of polarization $SOP_{WRU}$ and $SOP_{DUT}$ can be set independently from each other, in the third embodiment, there is only one state of polarization SOP for both the wavelength determination path 26 and the optical parameter determination path 27. For certain types of optical measurements, such as the determination of the Jones matrix and of the Differential Group Delay (DGD), this is sufficient.

Light 28 with a well-defined state of polarization is forwarded to the wavelength reference unit 29, in order to determine, in regular time intervals, the wavelength. For this purpose, the wavelength reference unit 29 might comprise interferometric devices as described above. The measured wavelength $\hat{\lambda}(kT, SOP)$, which depends on the state of polarization SOP, is forwarded to the processing unit 30.

The optical parameter determination path 27 comprises a sensor unit box 31 that contains a device under test (DUT) 32. The sensor unit box 31 might for example determine the horizontal component $I_{tx}$ as well as the vertical component $I_{ty}$ of the light intensity transmitted through the device under test 32. In this case, both the horizontal component 33 and the vertical component 34 of the intensity are forwarded to the processing unit 30.

In the following, it will be described how the measurement set-up shown in FIG. 5 can be used for determining the Jones matrix as a function of wavelength for a device under test. The Jones matrix $$A = \begin{pmatrix} a_{11}(\lambda) & a_{12}(\lambda) \\ a_{21}(\lambda) & a_{22}(\lambda) \end{pmatrix}$$

describes how the device under test transforms an incident light wave $E_i^{107}$ into a transmitted light wave $E_t^{107}$:

$$E_t^{\varpi} = \begin{pmatrix} a_{11}(\lambda) & a_{12}(\lambda) \\ a_{21}(\lambda) & a_{22}(\lambda) \end{pmatrix} \cdot E_i^{\varpi}$$

The parameters $a_{11}(\lambda)$, $a_{12}(\lambda)$, $a_{21}(\lambda)$, $a_{22}(\lambda)$ are complex parameters that vary as a function of $\lambda$.

Two wavelength scans are performed, with each wavelength scan comprising two wavelength sweeps, in order to determine the Jones matrix A. The first wavelength scan "Scan1" comprises a first wavelength sweep with a state of polarization SOP1, and a second wavelength sweep with a state of polarization SOP2, whereby the state of polarization SOP2 is orthogonal to SOP1. During each of said two wavelength sweeps, both the horizontal component 33 and the vertical component 34 of the transmitted intensity are determined. From the data obtained during Scan1, the complex matrix elements $a_{11}(\lambda)$, $a_{12}(\lambda)$, $a_{21}(\lambda)$, $a_{22}(\lambda)$ of the Jones matrix J can be calculated as a function of wavelength $\lambda$. Next, a Jones Matrix Eigenvalue (JME) analysis is performed, and the two Eigenvalues $EV1(\lambda, Scan1)$, $EV2(\lambda, Scan1)$ of $J'J^{-1}$, J' stands for the differentiation with respect to the wavelength, are obtained as a function of wavelength $\lambda$.

The second wavelength scan "Scan2" also comprises two wavelength sweeps. Compared to Scan1, the states of polarization are shifted by a parameter $\Delta$. Therefore, during the first wavelength sweep of Scan2, the state of polarization is SOP1+$\Delta$. During the second wavelength sweep of Scan2, the state of polarization is SOP2+$\Delta$. Again, the data recorded during the two wavelength sweeps of Scan2 allows to determine all the complex matrix elements of the Jones matrix A as a function of $\lambda$. After performing a Jones Matrix Eigenvalue (JME) analysis for the data of Scan2, the two Eigenvalues $EV1(\lambda, Scan2)$, $EV2(\lambda, Scan2)$ are obtained.

The Eigenvalues EV1, EV2 of $J'J^{-1}$ can be used for calculating the Differential Group Delay (DGD), which is defined as the difference of the imaginary parts of said two Eigenvalues. For Scan1, the Differential Group Delay DGD ($\lambda$, Scan1) is equal to $Im(EV1(\lambda, Scan1)-EV2(\lambda, Scan1))$.

Correspondingly, for Scan2, the Differential Group Delay $DGD(\lambda, Scan2)$ is obtained as $Im(EV1(\lambda, Scan2)-EV2(\lambda, Scan2))$.

Figure 6A:
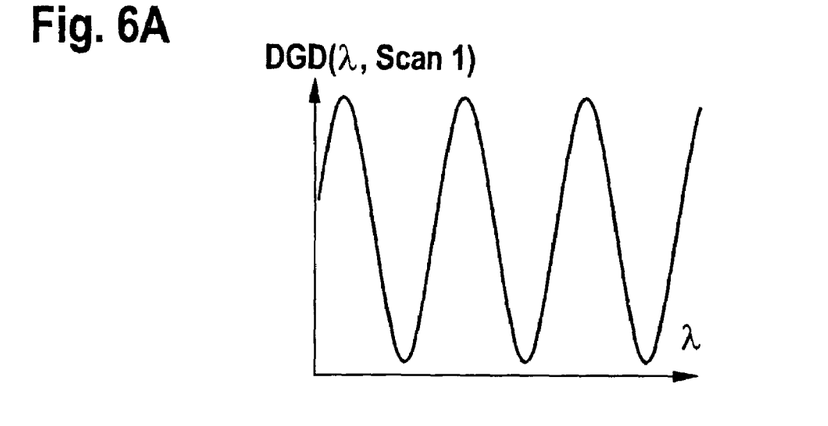
FIGS. 6A–C show Differential Group Delay as a function of wavelength.
Figure 6B:
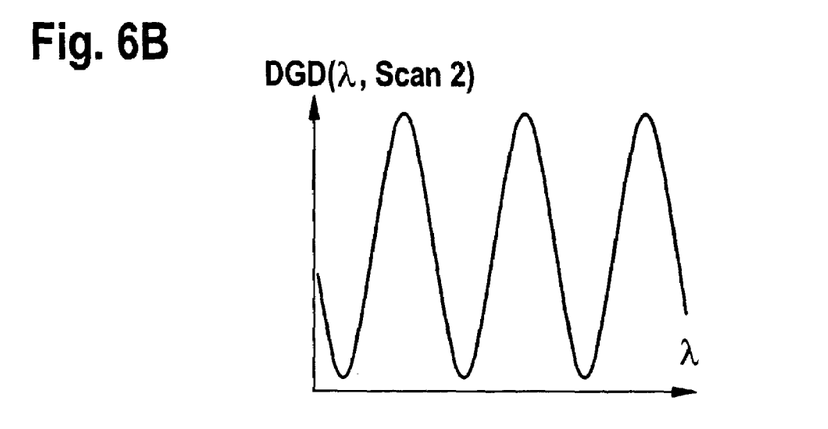

In FIG. 6A, the Differential Group Delay $DGD(\lambda, Scan1)$ determined from Scan1 is shown as a function of $\lambda$. Correspondingly, FIG. 6B depicts the Differential Group Delay $DGD(\lambda, Scan2)$ determined from Scan2 as a function of $\lambda$. It can be seen that both for $DGD(\lambda, Scan1)$ and for $DGD(\lambda, Scan2)$, there is an oscillating error superimposed on the Differential Group Delay that depends on the states of polarization during the wavelength sweeps of Scan1 and Scan2. The oscillations are out of phase, and therefore, the error can be reduced by performing an averaging procedure. $DGD_{AVERAGED}(\lambda)$ is obtained as the arithmetic means of $DGD(\lambda, Scan1)$ and $DGD(\lambda, Scan2)$:

$$DGD_{AVERAGED}(\lambda) = \frac{1}{2} \cdot (DGD(\lambda, Scan1) + DGD(\lambda, Scan2))$$

Figure 6C:
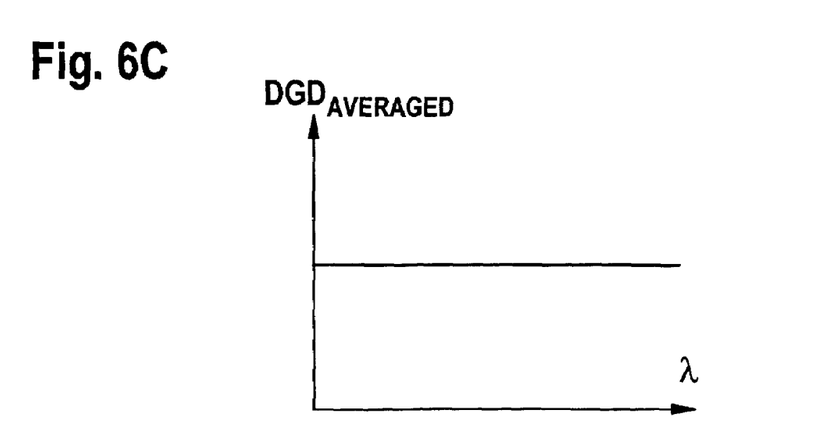

In FIG. 6C, the averaged Differential Group Delay $DGD_{AVERAGED}(\lambda)$ is shown as a function of wavelength. A measurement set-up of the kind shown in FIG. 5 allows to considerably reduce polarization dependent error.

Similarly, the Jones matrix can be used for calculating the polarization dependent insertion loss characteristics (average loss and polarization dependent loss, PDL) and the Group Delay (GD) characteristic of the DUT.

The invention claimed is:

1. An apparatus comprising:
   a polarization controller that receives light having a wavelength as a function of time, and selectively sets a state of polarization of said received light, and provides a polarized output having a first state of polarization or a second state of polarization;
   a first determination unit that (a) receives said polarized output, and (b) determines a first reference wavelength as a function of time for said first state of polarization, and a second reference wavelength as a function of time for said second state of polarization;
   a second determination unit that (a) receives, from a device under test (DUT), a signal as a function of time, wherein said DUT generates said signal in response to said light, and (b) determines, from said signal, a property of said DUT as a function of time; and
   a processing unit that processes (i) said first reference wavelength as a function of time, (ii) said second reference wavelength as a function of time, and (iii) said property of said DUT as a function of time, and determines a property of said DUT as a function of wavelength.

2. The apparatus of claim 1,
   wherein said processing unit determines said property of said DUT as a function of wavelength by determining an average of at least one of:
   (i) said first reference wavelength as a function of time for said first state of polarization, and said second reference wavelength as a function of time for said second state of polarization, or
   (ii) said property of said DUT as a function of time for said first state of polarization, and said property of said DUT as a function of time for said second state of polarization.

3. The apparatus according to claim 2, wherein, before determining said average, said processing unit:
   relates values of said DUT property as a function of time to corresponding values of (i) said first reference wavelength as a function of time, and (ii) said second reference wavelength as a function of time;
   determines said property of said DUT as a function of said first reference wavelength as a function of time; and
   determines said property of said DUT as a function of said second reference wavelength as a function of time.

4. The apparatus according to claim 2, wherein said processing unit determines an average of (i) values of said DUT property as a function of time that correspond to said first reference wavelength as a function of time, and (ii) values of said DUT property as a function of time that correspond to said second reference wavelength as a function of time.

5. The apparatus according to claim 2, wherein said polarized output generated by said polarization controller is provided to both of said first determination unit and to said DUT.

6. The apparatus according to claim 5, wherein said DUT property as a function of wavelength is a Jones Matrix of the DUT.

7. The apparatus according to claim 6, wherein from said Jones Matrix, at least one of a value of Insertion Loss, Polarization Dependent Loss, Group Delay, or Differential Group Delay of the DUT is obtained.

8. The apparatus according to claim 1, wherein said first determination unit comprises an interferometric device.

9. The apparatus according to claim 1, wherein said light is generated by a tunable light source that performs a wavelength sweep by continuously increasing or decreasing the wavelength of said light over a range of wavelengths.

10. The apparatus according to claim 9, wherein during a wavelength sweep, said DUT property as a function of time, said first reference wavelength as a function of time, and said second reference wavelength as a function of time are repeatedly determined at discrete instants of time.

11. The apparatus according to claim 1, wherein said light is generated by a tunable light source that performs (a) a first wavelength sweep while said polarization controller sets said first state of polarization, and said first determination unit determines said first reference wavelength as a function of time, and (b) a second wavelength sweep while said polarization controller sets said second state of polarization, and said first determination unit determines said second reference wavelength as a function of time.

12. The apparatus according to claim 1, wherein said first determination unit determines said first reference wavelength as a function of time during a sweep of said wavelength, at discrete instants of time.

13. The apparatus according to claim 1,
   wherein said polarization controller is a first polarization controller and sets a state of polarization of a first part of said light,
   wherein said polarized output is a first polarized output, and
   wherein said apparatus further comprises:
      a second polarization controller that sets a state of polarization of a second part of said light, and provides a second polarized output,
      wherein said second polarized output is set independently of said first polarized output, and
      wherein said second polarized output is provided to said DUT.

14. The apparatus of claim 1, wherein said processing unit determines said DUT property as a function of wavelength by:

determining a mean of (i) said first reference wavelength as a function of time, and (ii) said second reference wavelength as a function of time, to yield a mean reference wavelength as a function of time; and relating said DUT property as a function of time to said mean reference wavelength as a function of time.

15. The apparatus of claim 1, wherein said processing unit determines said DUT property as a function of wavelength by:

determining a mean of (i) said first reference wavelength as a function of time, and (ii) said second reference wavelength as a function of time, to yield a mean reference wavelength as a function of time;

determining a mean of (i) said DUT property as a function of time in response to said light at said first state of polarization, and (ii) said DUT property as a function of time in response said light at the second state of polarization, to yield a mean DUT property as a function of time; and     relating said mean DUT property as a function of time to said mean reference wavelength as a function of time.

16. The apparatus of claim 1, wherein said processing unit determines said DUT property as a function of wavelength by:

determining a first DUT property as a function of time in response to said light at said first state of polarization;

determining a second DUT property as a function of time in response said light at said second state of polarization;

relating said first DUT property as a function of time to said first reference wavelength as a function of time;

relating said second DUT property as a function of time to said second reference wavelength as a function of time, and     determining a mean of said first and second DUT properties as a function of time, over wavelength.

* * * * *